Figure 1:
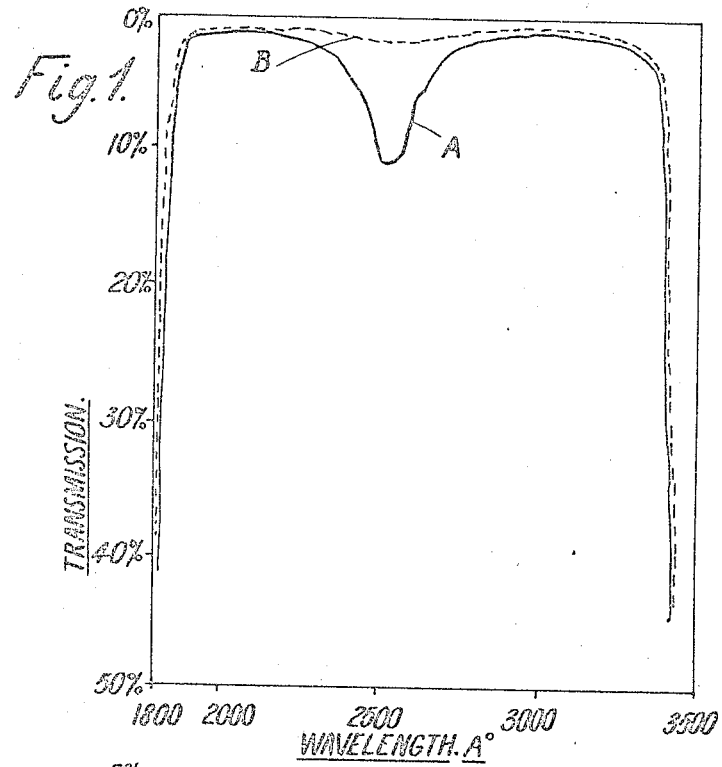

United States Patent Office 3,317,328
Patented May 2, 1967

3,317,328
PROCESS FOR THE MANUFACTURE OF ULTRA-VIOLET LIGHT ABSORBING CELLULOSIC FILMS
James Charles Brunton, North Petherton, Somerset, England, assignor to British Cellophane Limited, Bridgwater, England, a British company
Filed June 25, 1963, Ser. No. 290,431
Claims priority, application Great Britain, July 4, 1962, 25,666/62
9 Claims. (Cl. 106—165)

This invention relates to a process for the manufacture of ultra-violet absorbing cellulosic articles and in particular, to cellulose film, filaments, fibres, ribbons and the like formed from cellulosic article-forming materials such as viscose and hydroxyethyl cellulose solutions.

Cellulosic films having ultra-violet light absorption properties are particularly useful in protective packaging applications in which the packaged goods are susceptible to being affected deleteriously by prolonged exposure to ultra-violet light. Further, the degradation of cellulosic articles, particularly filaments, on exposure to ultra-violet light may be resisted to a substantial degree by the incorporation of ultra-violet light absorbing agents.

In British Patent No. 495,479, there is described the manufacture of a sheet material such as paper or regenerated cellulose film having incorporated therein a 1:3:5 triazine derivative which does not essentially colour the sheet but which absorbs ultra-violet light. The triazine derivative may be incorporated in the sheet in the process of manufacture of the latter or by immersing the sheet in an aqueous solution of the derivative.

Also, British Patent No. 864,900 describes a process for improving the optical properties of cellulose-containing materials such as fibres of natural or regenerated cellulose or foils of regenerated cellulose in which process a water-soluble compound capable of absorbing ultra-violet light and not having the character of a dyestuff and which contains at least one triazine ring substituted by two halogen atoms or one halogen atom and one hydroxyl group or one halogen atom and one alkoxy group containing up to 3 carbon atoms, is fixed on the cellulose-containing material with the use of an agent capable of binding hydrogen halide.

Whereas the ultra-violet absorbing agents of the prior art are useful in many applications, some wavelengths in the ultra-violet light absorption spectrum are absorbed considerably less strongly than other wavelengths. It has now been found that certain 1:3:5 triazine derivatives have an improved absorption spectrum in which the absorptivity of the various wavelengths tend to be more constant.

Accordingly, the present invention includes a process for the manufacture of an ultra-violet light absorbing cellulosic article comprising extruding an article forming cellulosic material into a coagulation medium to form a shaped article and reacting the cellulosic material or the shaped article in the presence of an alkali with a 1:3:5 triazine derivative having the configuration:

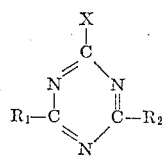

where X is a bromine or chlorine atom, $R_1$ is either an aminobenzene carboxylic acid radical or an amino benzene sulphonic acid radical and $R_2$ is a secondary amino group.

The halogen atom (X) is preferably chlorine and the secondary amino group ($R_2$) is preferably a dialkylamino group, for example a dimethylamino group or a piperidino group.

Examples of suitable triazine derivatives in accordance with the invention are 2-chloro-4-piperidino-1,3,5 triazinylamino-benzene-4-carboxylic acid; 2-chloro-4-dimethylamino-1,3,5 triazinylamino-benzene-4-carboxylic acid; 2-chloro-4-(N-methylaniline) - 6-(4'-carboxyphenylamine)- 1,3,5 triazine; 2-chloro - 4 - (di-iso-butylamino)-6-(4-carboxyphenyl amino)-1,3,5-triazine; 2-chloro-4-piperidino-6-(2'-carboxy phenylamine)-1,3,5-triazine and 2-chloro-4-piperidino-1,3,5-triazinyl aminobenzene-4-sulphonic acid.

Examples of cellulosic article forming materials from which the shaped articles may be formed by extrusion and coagulation are viscose (a solution of cellulose xanthate in sodium hydroxide) and hydroxyethyl cellulose in a solution of sodium hydroxide.

The reaction of the triazine derivative with the cellulosic article-forming material before the material is extruded constitutes a particularly convenient and economic method of incorporating the triazine derivative in the shaped article and constitutes the preferred method in accordance with the invention. Apart from obtaining a uniform distribution of the derivative throughout the cellulosic material, the time required for the reaction of the derivative with the cellulose chains (about 10 hours at 25° C.) can conveniently be accommodated during the storage of the cellulosic material prior to casting. For example, when the cellulosic material is viscose, the reaction between the cellulose chains and the triazine derivative can proceed during the normal ageing period of the viscose.

Alternatively, the cellulosic article formed on coagulating the cellulosic material may be treated with the triazine derivative by reacting the article with the derivative in the presence of an alkali such as sodium hydroxide. However, this procedure is long, even if heat is applied, and inconvenient, particularly if the article is produced by a continuous process.

The shaped article may be a film, filament, fibre, ribbon or the like.

It is found that only triazine derivatives with one reactive halogen atom, for example a chlorine atom, are useful in accordance with the preferred method of the present invention. When an attempt is made to employ a triazine derivative with two reactive halogen atoms, the viscosity of the cellulosic article-forming material is changed and the coagulating properties are deleteriously affected.

Cellulosic articles incorporating the residue of the triazine derivative in accordance with the invention absorb ultar-violet light in the range of wavelength from about 1900 A. to about 3300 A.

The range of wavelength from about 1900 A. to about 2200 A. is absorbed strongly by the triazine ring and to some extent by the cellulose itself. Substitution in the triazine ring of the aminobenzene carboxylic acid or the aminobenzene sulphonic acid modifies the absorption characteristics to give strong absorption of light in the range of from about 2600 A. to about 3300 A. The additional substitution of the secondary amino group in the triazine ring provides an additional strong absorption band in the wavelength range of from about 2200 A. to about 2600 A.

Any amount of the triazine derivative reacted with the cellulosic article-forming material or the article will confer ultar-violet light absorbing properties upon the shaped cellulosic article. However, the amount of ultra violet light absorbed by the triazine derivative depends upon a number of factors including the concentration of the triazine derivative in the article and the length of the path traversed by the ultra-violet light through the article.

For example, when manufacturing a film of thickness of about 0.001 inch, the amount of triazine derivative reacted with the cellulosic film-forming material or the film should not be lower than about 0.2% by weight of the solid cellulosic derivative. When using amounts of triazine derivative in this lower range, there is some ultra violet light transmission in the range from about 2400 A. to 2600 A. This transmission decreases with increase in amount of triazine derivative added to the cellulosic film forming material or film and becomes substantially negligible when 2.0% by weight of the triazine derivative based on the weight of the solid cellulosic derivative is added to the film forming material or the film. On further increase of the amount of triazine derivative beyond 3.0% by weight, there is substantially little improvement in the ultra violet light absorbing properties of the cellulosic film of thickness about 0.001 inch. The amount of triazine derivative required to absorb ultra violet light to the same degree in a film varies indirectly with the thickness of the film, thus where the thickness of the film is $t$ inch, the amount of triazine reacted with the cellulosic material or film is preferably not less than $$\frac{0.001}{t} \times 2.0\%$$

by weight of the solid cellulosic material in order to obtain optimum ultra-violet light absorption.

Figure 2:
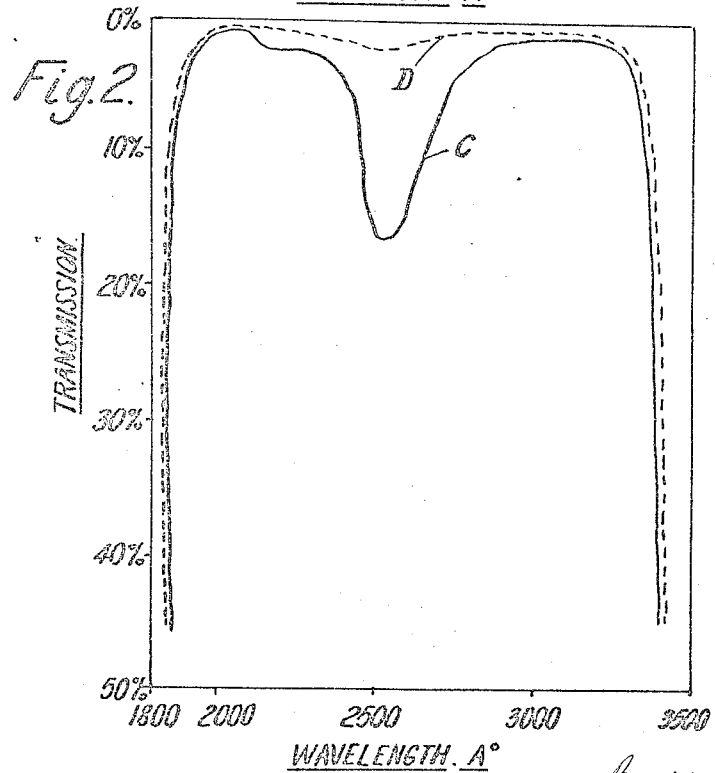

The invention will now be illustrated by way of the following specific examples and with reference to the accompanying drawings, in which FIGURE 1 and FIGURE 2 show the ultra-violet light absorption spectra of cellulosic film manufactured in accordance with the examples.

*Example I*

0.1 gram of 2-chloro-4-piperidino-1,3,5-triazinylamino benzene-4-carboxylic acid was dissolved in 100 grams of viscose (containing about 10% solids) and was stored for 12 hours at 25° C. to permit the completion of the reaction of the triazine derivative with the cellulose chains in the viscose. The viscose was then cast into cellulose film 0.001 inch in thickness by a conventional casting method in which the viscose was extruded into a coagulation bath. The ultra-violet light absorption spectrum of the film was measured and the light transmission expressed in percentage transmission was plotted against wavelength of light in angstrom units. The resultant graph is shown at A in FIGURE 1.

*Example II*

The procedure described in Example I was repeated with the exception that 0.2 gram of the triazine derivative was added to 100 grams of viscose. The spectrum of the film was plotted and the graph which was obtained is shown at B in FIGURE 1.

*Example III*

The procedure described in Example II was repeated except that a hydroxyethyl cellulose solution in caustic soda (containing about 10% solids) was used in the place of the viscose. On plotting the spectrum of the hydroxyethyl cellulose film, the graph obtained was substantially the same as the graph B (FIGURE 1) obtained with the cellulose film prepared in Example II.

*Example IV*

The procedure described in Example I was repeated except that 0.1 gram of 2-chloro-4-dimethylamino-1,3,5-triazinylaminobenzene-4- carboxylic acid was used as the triazine derivative.

On plotting of the spectrum of the resultant cellulose film, the graph marked C in FIGURE 2 was obtained.

*Example V*

The procedure described in Example IV was repeated except that 0.2 gram of the 2-chloro-4-dimethylamino-1,3,5-triazinylaminobenzene-4 - carboxylic acid was employed. On measurement of the spectrum of the resultant cellulose film, the graph marked D in FIGURE 2 was obtained.

*Example VI*

The procedure described in Example I was repeated with the exception that 0.2 gram of 2-chloro-4-piperidino-1,3,5-triazinylamino benzene-4-sulphonic acid was added to the 100 grams of viscose.

The spectrum of the cellulose film was measured and was found to follow closely the graph shown at B in FIGURE 1.

*Example VII*

0.2 gram of 2-chloro-4-piperidino-1,3,5-triazinylamino benzene-4-carboxylic acid was dissolved in 100 grams of viscose (containing about 10% solids) and was stored for 12 hours at 250° C. to permit completion of the reaction of the triazine derivative with the cellulose chains in the viscose. The viscose was then extruded through a spinneret into a conventional coagulation bath to form filaments. On prolonged exposure of the filaments to ultra-violet light, no degradation was observed.

Cellulosic films manufactured in accordance with the present invention are particularly useful in the packaging of merchandise which is liable to deleterious changes when subjected to prolonged exposure to ultra-violet light.

I claim:

1. A process for the manufacture of an ultraviolet light absorbing cellulosic article comprising extruding an article forming cellulosic material containing cellulose chains and selected from the group consisting of viscose and hydroxyethyl cellulose into a coagulation medium to form a shaped article containing said cellulose chains wherein the cellulose chains are reacted with between 0.2 and 3.0% by weight based on the solid cellulosic material of a colorless 1:3:5 triazine derivative in the presence of an alkali, the 1:3:5 triazine having the configuration:

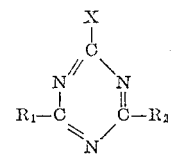

in which X is a halogen atom selected from the group consisting of bromine and chlorine, $R_1$ is an aminobenzene acid radical selected from the group consisting of aminobenzene carboxylic acid radical and aminobenzene sulphonic acid radical and $R_2$ is a secondary amino group having substantially no coloring properties.

2. A process as claimed in claim 1 in which the 1:3:5 triazine derivative is reacted with the cellulose chains in the article forming cellulosic material prior to extrusion into the coagulation medium.

3. A process as claimed in claim 1 in which the cellulosic material is viscose and the 1,3,5 triazine derivative is reacted with the viscose prior to extrusion.

4. A process as claimed in claim 1 in which the shaped article is a film.

5. A process as claimed in claim 1 in which the amount of triazine derivative reacted with the cellulosic material is in the range between $$\frac{0.001}{t} \times 2.0\%$$

and $$\frac{0.001}{t} \times 3.0\%$$

by weight of the solid cellulosic material, where $t$ is the thickness of the cellulosic material in inches.

6. A process as claimed in claim 1 in which the shaped article is a filament.

7. A process as claimed in claim 1 in which the secondary amino group ($R_2$) of the 1:3:5 triazine derivative is a dialkylamino group.

8. A process as claimed in claim 1 in which the triazine derivative is 2-chloro-4-piperidino - 1,3,5 - triazinylamino benzene-4-carboxylic acid.

9. An ultra-violet light absorbing cellulosic article in which the cellulose chains in the article formed from cellulosic material selected from the group consisting of viscose and hydroxyethyl cellulose are reacted with between 0.2 and 3.0% by weight based upon the solid cellulosic material of a colorless 1,3,5 triazine derivative having the configuration:

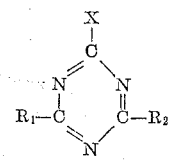

in which X is a halogen atom selected from the group bromine and chlorine, $R_1$ is an aminobenzene acid radical selected from the group aminobenzene carboxylic acid radical and aminobenzene sulphonic acid radical and $R_2$ is a secondary amino group having substantially no coloring properties.

References Cited by the Examiner
UNITED STATES PATENTS

| | | | |
|---|---|---|---|
| 3,055,896 | 9/1962 | Boyle et al. | 106—176 |
| 3,118,887 | 1/1964 | Hardy et al. | 106—176 |
| 3,214,325 | 10/1965 | Gaertner | 106—176 |

ALEXANDER H. BRODMERKEL, *Primary Examiner.*

D. J. ARNOLD, *Assistant Examiner.*